Feb. 3, 1925.
J. GOLDSTEIN
MOLD
Filed April 4, 1923
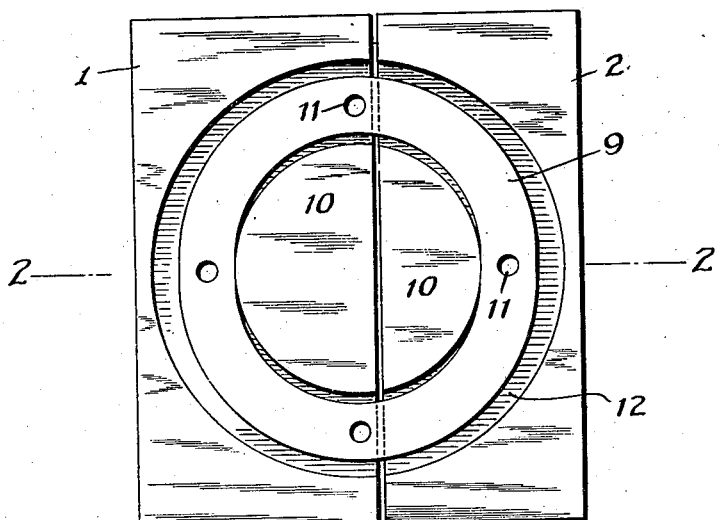
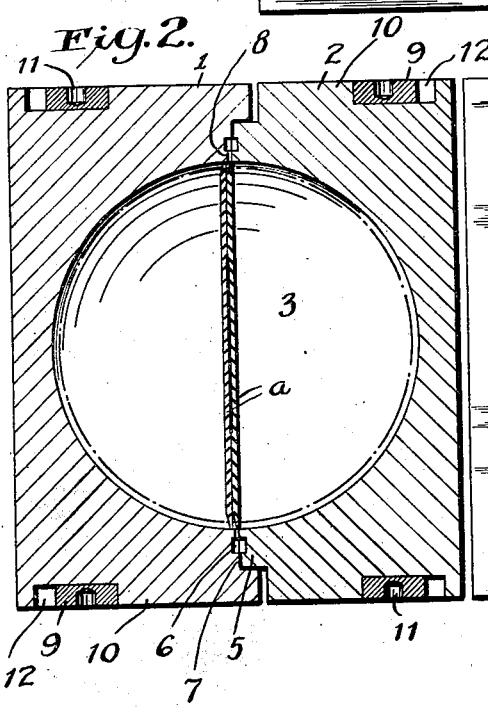
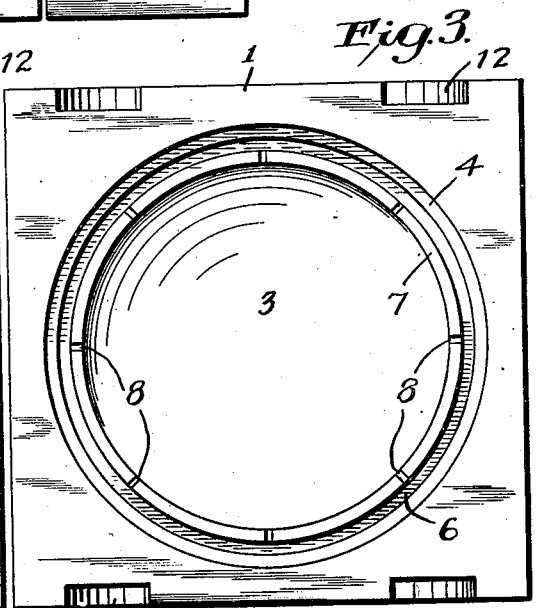
INVENTOR
Jules Goldstein
BY
ATTORNEY Patented Feb. 3, 1925.

1,525,126

UNITED STATES PATENT OFFICE.

JULES GOLDSTEIN, OF PARIS, FRANCE.

MOLD.

Application filed April 4, 1923. Serial No. 629,879.

*To all whom it may concern:*

Be it known that I, JULES GOLDSTEIN, a Russian citizen, residing in the city of Paris, France, have invented a new and useful Mold, of which the following is a specification.

The invention relates to a mold for making hollow rubber articles, as by the method claimed in my copending application, Serial No. 624,075, filed March 10, 1923. The object is to provide an advantageous mold for such purposes, and the invention comprises certain novel features and combinations which will now be described and will be more particularly pointed out in the claims.

In the drawings forming part hereof:

Fig. 1 is an elevation of the mold looking at one of the split faces provided with a locking ring;

Fig. 2 is a section on the line 2—2 of Fig. 1; and

Fig. 3 is an interior face view of one of the halves of the mold.

The mold comprises two halves or members 1 and 2, each containing half of the mold cavity 3. The mold is shown as containing a single cavity, but the invention is equally applicable to a multiple mold, and in practice the molds will usually contain a plurality of cavities for molding a number of articles at a time. The mold is designed more particularly for use in the dilating and vulcanizing process disclosed in my copending application aforesaid. Two sheets a are represented standing centrally of the cavity in Fig. 2, to be distended by volatilization of material placed between them into contact with the surface of the cavity, as indicated by broken lines, upon the application of vulcanizing heat.

The member 1 is formed with a rabbet 4 surrounding the mold cavity, and the member 2 has a corresponding projection 5, the faces of the rabbet and projection being the meeting faces.

An annular channel 6 is formed in the meeting faces, the portion of the faces between this channel and the mold cavity being preferably close fitting, while the faces outside the channel may be less accurately finished. In one or both of the inner faces 7 vent grooves 8 are formed to communicate with the channel 6, from which air displaced from the interior of the mold can make its escape. In practice the grooves 8 will be much smaller than they are shown in the drawing for purpose of illustration.

The two parts of the mold are locked together by a simple cam device, comprising substantially elliptical rings 9 cooperating with substantially elliptical split bosses 10 formed on opposite split faces of the mold, one half, more or less, of each boss being on one member of the mold and the complementary part of the boss on the other. These locking provisions are upon opposite faces of the mold, as seen in Fig. 2, and when the rings are in the position of Fig. 1 they can be removed and the mold separated. By turning them from this position by means of a suitable tool engaged in holes 11, the parts of the bosses, and therefore the halves of the mold. will be clamped together.

The rings when in place are sunk flush with the outer faces within recesses 12 in the mold faces, these recesses surrounding and by their presence forming the bosses.

What I claim as new is:

1. A mold for making hollow rubber articles comprising two parts containing halves of the mold cavity. one part having a rabbet around the cavity and the other part having a corresponding projection, one or both of the meeting faces of the rabbet and projection having radial air vent passages formed therein extending outward from the mold cavity when the parts are completely closed.

2. A mold for making hollow rubber articles comprising two parts containing halves of the mold cavity, one part having a rabbet around the cavity and the other part having a corresponding projection, the meeting faces of the rabbet and projection having an annular channel and therewith connecting radial vent grooves formed therein, said vent grooves extending outward from the mold cavity when the parts are completely closed.

3. A mold for making hollow rubber articles comprising two parts containing halves of the mold cavity, one part having a rabbet around the cavity and the other part having a corresponding projection, the meeting faces of the rabbet and projection being formed with an annular channel, and the surfaces inside said channel being closely fitting and containing radial vent grooves, said vent grooves extending outward from the mold cavity when the parts are completely closed.

4. A mold comprising two members having on opposite faces complementary parts of an elliptical split boss, and elliptical locking rings cooperating with said bosses, so that by rotating the rings about the split bosses the members of the mold will be clamped or released.

JULES GOLDSTEIN.